July 21, 1959  A. W. MALL ET AL  2,895,466
CHAIN SAW STARTER MECHANISM
Filed Feb. 14, 1955  5 Sheets-Sheet 1

INVENTORS
ARTHUR W. MALL
CHARLES A. MATTSON
WALTER ZIEGLER
BY John Bundock Jr
ATTORNEY

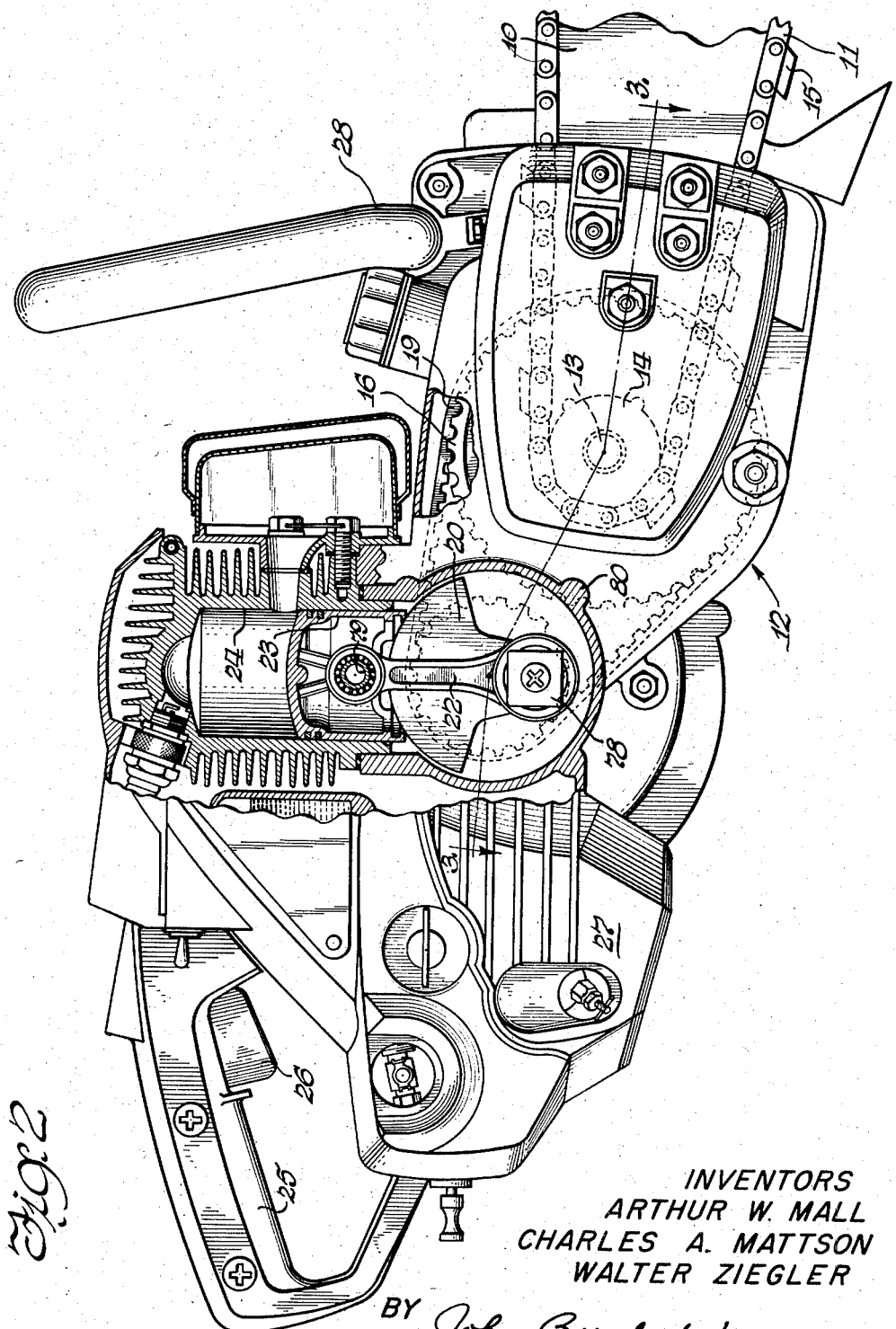

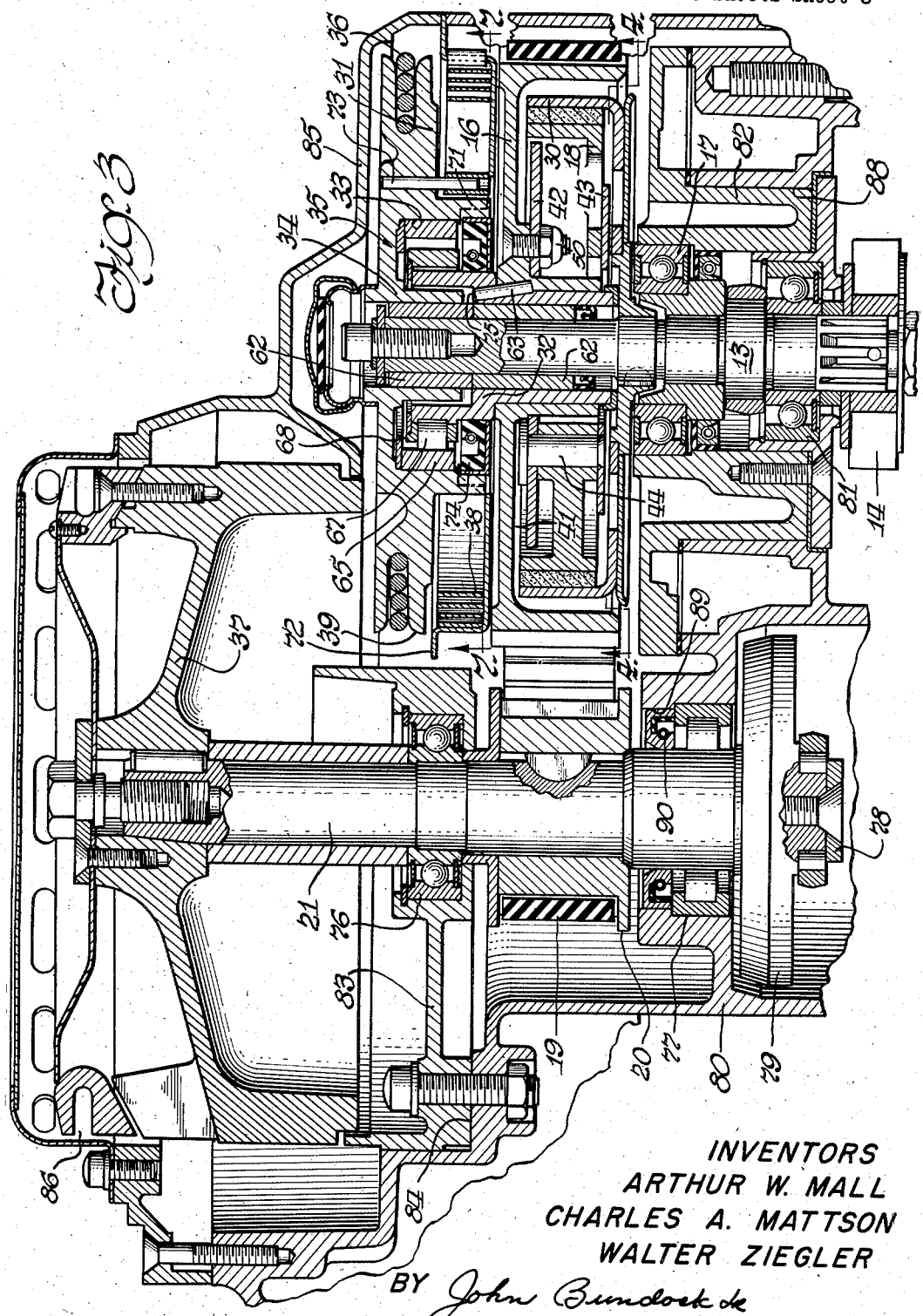

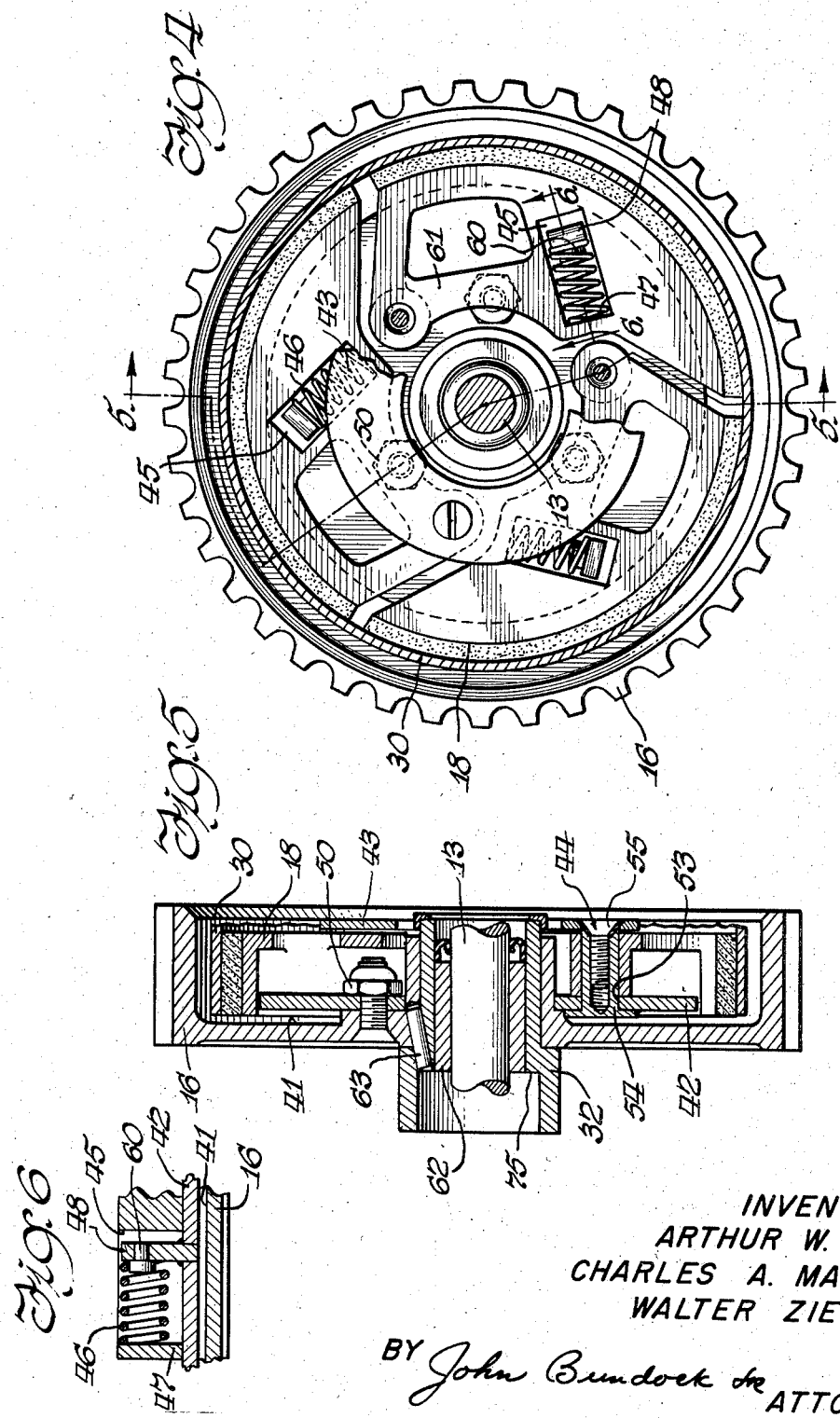

July 21, 1959    A. W. MALL ET AL    2,895,466
CHAIN SAW STARTER MECHANISM
Filed Feb. 14, 1955    5 Sheets-Sheet 5
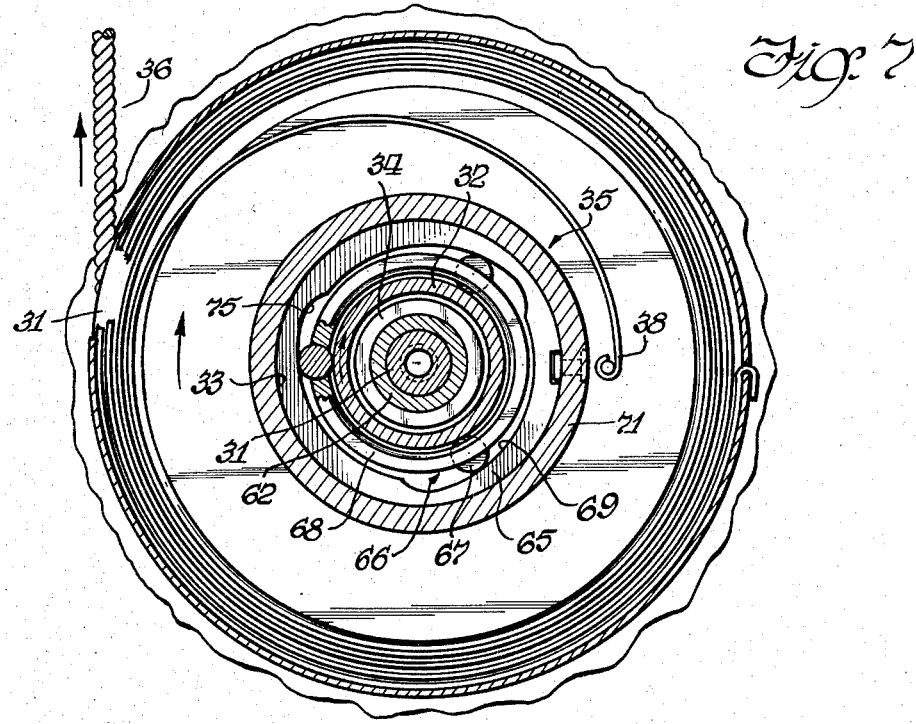
Fig. 7
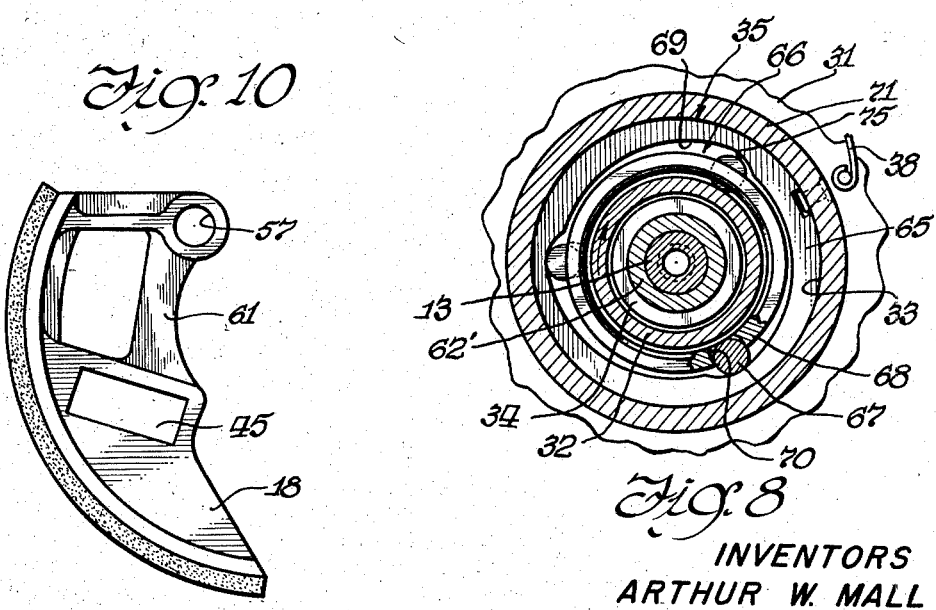
Fig. 10
Fig. 8
INVENTORS
ARTHUR W. MALL
CHARLES A. MATTSON
WALTER ZIEGLER
BY John Burdock Jr.
ATTORNEY

United States Patent Office 2,895,466
Patented July 21, 1959

2,895,466

CHAIN SAW STARTER MECHANISM

Arthur W. Mall, Flossmoor, and Charles A. Mattson and Walter Ziegler, Crete, Ill., assignors, by mesne assignments, to Remington Arms Company, Inc., Bridgeport, Conn., a corporation of Delaware Application February 14, 1955, Serial No. 487,942

6 Claims. (Cl. 123—179)

This invention relates to a transmission for a power chain saw and more particularly to a belt drive type transmission employing a nested driven pulley, clutch and starter assembly supported on the sprocket shaft.

Various arrangements of the engine crankshaft and sprocket shaft with a gear or belt drive have been used in power chain saw transmissions. In the type in which the two-cycle gasoline engine crankshaft is mounted parallel with the sprocket shaft, which is journalled in the saw housing, one difficulty encountered is with the alignment of the several components required in the machine, the automatic clutch, the gear or belt drive, and the rewind starter. Furthermore, in transmissions of this type, various forms of rewind starter and automatic clutch have been used to insure ruggedness and dependability in a simple compact construction.

It is an object of the present invention to provide a novel sprocket shaft assembly in the transmission of a power chain saw incorporating a rewind starter and a centrifugal clutch assembly nested with a pulley and clutch drum, the pulley being located adjacent the rewind starter and being driven by a belt from the engine crankshaft.

Another object is to provide a drive arrangement between the rewind starter and the driven pulley, including a sleeve on the driven pulley telescoped into an annular recess in the starter rope pulley, thus presenting on the outside a surface for engagement by a roller clutch of the over-riding type housed in the recess, and bearing on the inside upon a hub journalled on the sprocket shaft.

Another object is to provide a centrifugal clutch including a plurality of centrifugally actuated clutch shoes mounted on the face of and housed within the driven pulley, each acting against individual compression springs opposing outward movement toward the clutch drum which is keyed to the sprocket shaft and supported inside the pulley and about the clutch shoe assembly.

The invention will be described with reference to the accompanying drawings, in which:

Fig. 3 is a sectional view of the transmission taken along the line 3—3 of Fig. 2;

Fig. 4 is an enlarged detailed view of the driven pulley and clutch shoe assembly;

Fig. 5 is a sectional view of the pulley and clutch shoe assembly taken along line 5—5 of Fig. 4;

Fig. 6 is a detail view in section of the clutch shoe and compression spring taken along line 6—6 of Fig. 5;

Fig. 7 is a sectional view showing the starter with the starter clutch engaged, taken along line 7—7 of Fig. 3;

Fig. 8 is a view in section of the over-riding starter clutch with the rollers in the deep part of the rollways and the clutch disengaged;

Fig. 9 is a view from the left hand side of the transmission housing, with the magneto, fan and fan shroud, and transmission cover removed to show the pulleys, belt connecting the pulleys and starter;

Fig. 10 is an enlarged detail view of the shoe employed in the centrifugal clutch.

Figure 1:
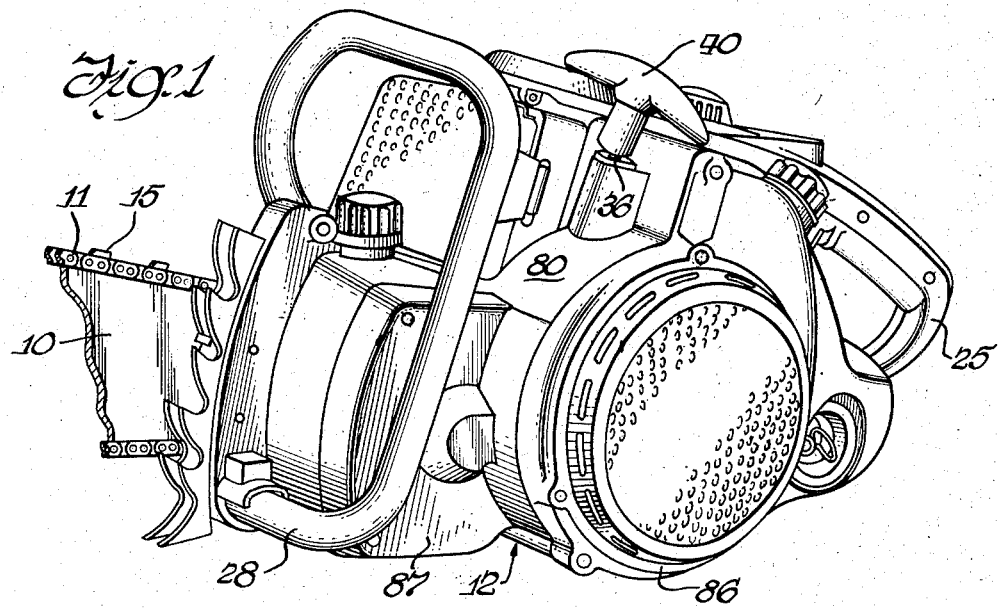
Fig. 1 is a perspective view illustrating a power chain saw provided with the novel transmission.
Figure 2:
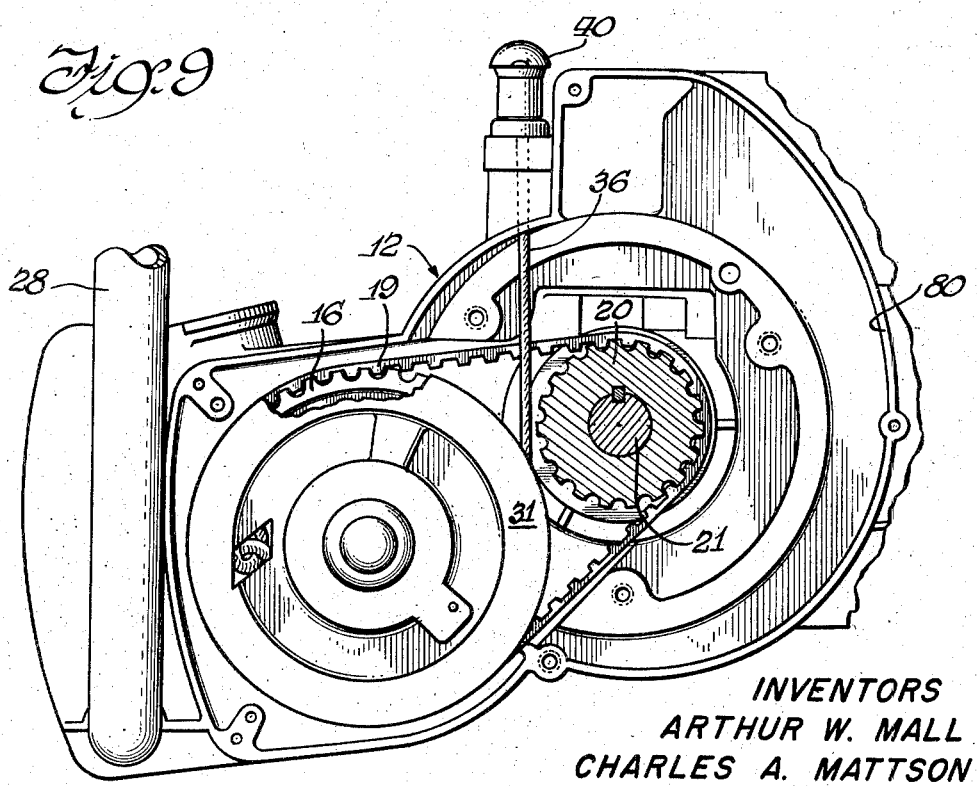
Fig. 2 is a view from the right hand side of the power chain saw with parts of the engine and housing broken away to reveal the belt drive.

A power chain saw is shown in Figs. 1 and 2 having a guide bar 10 around which the cutting chain 11 is trained. Guide bar 10 is mounted on the power saw housing 12, in which is supported a sprocket shaft 13 carrying and turning a sprocket 14 which drives the cutting chain around the guide bar. Cutters 15 adapted to cut and define the kerf in the sawing operation are carried on cutter bearing links spaced down the saw chain.

Sprocket shaft 13 carries an assembly including driven pulley 16 rotatably journalled on this shaft adjacent bearing 17 (Fig. 3) which supports the shaft and the assembly in housing 12. Centrifugally actuated clutch shoes 18 couple the driven pulley 16 to the sprocket shaft when the driven pulley is brought to the speed of engagement of the assembly by means of a belt 19 which connects driven pulley 16 with driving pulley 20 keyed to chrankshaft 21. A two-cycle gasoline engine in the saw housing 12 has a piston 23 operating in cylinder 24 mounted above the crankshaft 21 and drives crankshaft 21 through connecting rod 22. Behind the engine on the housing is a handle 25 which receives a pivotally supported manually actuated trigger 26 connected to the engine throttle (not shown) found under cover 27.

This power saw is held by means of handle 25 and handle bar 28 to cut in either of two positions, the felling position with the guide bar 10 horizontal and the saw tipped 90° from the position shown in Fig. 1, and the bucking position with the guide bar positioned as shown. In the felling position it is necessary in order to enable the saw to cut close to the ground to have the cutting chain and guide bar spaced from the center line of the saw and close to one side of the saw housing. It is satisfactory for the center of gravity of the saw to be off-center toward the heavy parts of the engine when the saw is held to make the felling cut, and to be off-center somewhat toward the guide bar side when making the bucking cut. In Figs. 2 and 3 the offset of the guide bar slightly from the axis of the engine cylinder can be observed.

Within the driven pulley 16 is mounted a centrifugal clutch with shoes 18 which swing outward to engage clutch drum 30 supported on and keyed to sprocket shaft 13. Clutch drum 30 also fits within driven pulley 16 to embrace the centrifugal clutch shoe assembly. Rotatably supported on the sprocket shaft 13 adjacent driven pulley 16 is starter pulley 31 which is employed to turn driven pulley 16 and the crankshaft during starting. Driven pulley 16 is supported on a hub having a sleeve 32 which extends behind pulley 16 into annular recess 33 in starter pulley 31, bearing on its inside upon hub 34 of the starter pulley. Sleeve 32 presents its outer surface for engagement by an over-riding type clutch 35 housed in recess 33.

When the driven pulley 16 is rotated by a pull on the starter rope 36 the crankshaft 21 turns to start the engine. Clutch 35 disengages starter pulley 31 automatically from sleeve 32 on the driven pulley when the engine starts.

During starting and at low engine speeds, the clutch shoes 18 are held out of engagement with clutch drum 30 by clutch springs, and the driven pulley 16 is freely rotatable on the sprocket shaft. When the engine is brought up to speed, the centrifugal clutch is energized and the sprocket shaft is driven.

The nested arrangement of starter pulley 31, sleeve 32, driven pulley 16, clutch 18 and clutch drum 30, provides a narrow and compact assembly, allowing the overhang of sprocket shaft 13 from its bearing 17 to be held to a minimum.

In the operation of this gasoline engine chain saw the cutting chain 11 is driven at high speed, 800 feet to 1200 feet per minute, around the guide bar 10 by means of the sprocket 14 which engages drive links of the chain. Power from the two-cycle engine is fed to the sprocket through the belt drive transmission and sprocket shaft assembly.

Starting the engine is accomplished by means of the manually operated rewind starter, which is carried on the sprocket shaft adjacent the centrifugal clutch assembly. By placing the starter on the sprocket shaft, advantage is taken of the transmission ratio of approximately 3–1 between the large diameter driven pulley and small diameter drive pulley, so that a short hard pull on the starter rope 36 which turns the driven pulley one revolution turns the drive pulley and crankshaft three revolutions. The speed of rotation of the crankshaft is increased and a magneto (not shown) mounted on the crankshaft adjacent the fan 37 is turned through three extremely hot sparks due to the increased speed. Spring 38 acting against starter pulley 31 rewinds rope 36 in the groove 39 of the pulley, so that starting the engine involves simply grasping the grip 40 and giving the hard pull on the starter rope to turn the engine crankshaft, allowing rewind spring 38 to pull the rope back into the housing.

The centrifugal clutch is supported with pulley 16 on the inside face of the pulley end wall 41 by means of a clutch plate 42 which is secured by bolts 50 to the pulley 16. Shoes 18 are pivotally mounted between the clutch plate and annular ring 43 which is supported opposite the clutch plate on pins 44. Shoes 18 pivot outwardly between the annular ring and clutch plate which function to guide the shoes toward clutch drum 30 to engage the drum and couple driven pulley 16 to sprocket shaft 13. A centrifugal clutch is incorporated in the transmission of a power chain saw for reasons of safety, to uncouple the engine from the chain automatically at low engine speeds. During starting, the driven pulley is turned by the manually operated rewind starter at a speed much below the speed at which the centrifugal clutch assembly engages. Thus the driven pulley freely rotates on the sprocket shaft and neither the sprocket nor the chain are operated. Turning the sprocket shaft and sprocket directly during starting would require an increased physical effort due to the greater load placed on the starter than the engine alone. Therefore, the starter pulley 31 is also freely rotatable on the sprocket shaft and engages sleeve 32 by means of over-riding clutch 35 to turn driven pulley 16.

Each shoe 18 is provided with a slot 45 receiving a spring 46 bearing against the end 47 of the slot and against lug 48 which stands on the clutch plate 42. The spring 46 opposes outward movement of the shoe. In the preferred form of this invention illustrated, a plurality of openings 53 are provided in the clutch plate 42 (Figs. 5, 6) and flanged inserts 54 are fastened in place on the clutch plate 42 by means of screws 55 which secure in place annular ring 43 opposite the clutch plate 42. Shoes 18 are provided with openings 57 (Fig. 10) through which the inserts 54 pass forming a pivotal support for the shoes on the face of the clutch plate. Lug 48 stands positioned in one end of each of the slots 45 and carries a short pin 60 about which spring 46 loosely fits. Clutch shoes 18 swing outward at high speeds of the assembly causing the springs 46 to compress. Springs 46, in turn, tend to maintain shoes 18 out of engagement with the clutch drum 30 by forcing the clutch shoe in toward the axis of the clutch plate. Annular ring 43, carried on the ends of the flanged inserts lies partly over slots 45, preventing the springs 46 from moving laterally out of the slots. Pin 60 on the lug also prevents lateral movement of the spring 46, preventing jamming and improper action of the spring.

Annular ring 43 also, in cooperation with clutch plate 42, guides shoes 18 in their outward movement toward the clutch drum. By presenting bearing surfaces engaging the sides of the shoe casting in the heel portion 61 of the shoe, the shoe slides against the inner faces of the annular ring and clutch plate bearing against those members and being held in alignment.

Slots 45 are formed, in the preferred embodiment of this invention illustrated in Fig. 4, substantially tangential to a circle drawn from a center lying on the axis of pin 44. Lug 48 positioned in the slot 45 is not engaged by the sides of the slot and thus does not interfere with the pivotal movement of shoe 18.

Driven pulley 16 is toothed on its outer surface so as to receive a drive belt which is trained around this driven pulley and the driving pulley carried on the crankshaft and is mounted on a bushing 62 which is journalled on sprocket shaft 13. Adjacent driven pulley 16, in the sprocket shaft assembly is starter pulley 31 mounted on bushing 62'. Sleeve 32 telescopes into an annular cavity or recess 33 provided in the face of the starter pulley 31 opposite the driven pulley 16. The inner surface of sleeve 32 bears against the inside surface of the annular cavity which may also be termed the outside of the starter pulley hub, while the outside surface of said sleeve is presented for engagement by an over-riding clutch 35 housed in the annular cavity.

The over-riding clutch 35 is formed in the preferred embodiment shown in Fig. 8, by an insert 65 having a plurality of rollways 66 adapted to receive rollers 67 spaced and held in position by a ring 68. Each rollway 66 has an inclined cam surface 69 with shallow and deep portions. Rollers 67 extend through openings 70 in ring 68 and contact the outer surface of the sleeve 32 when positioned along the inclined cam surface of the rollways 66. When the rollers 67 are in the deep portions 75 of the rollways they drop through the openings 70 out of engagement with the sleeve 32. Thus by moving the ring 68 relative to the insert 65 the rollers are caused to engage sleeve 32 and bring starter pulley 31 in driving relation with driven pulley 16. Ring 68 fits closely around sleeve 32 and is frictionally engaged by the outside of the sleeve, which aids in positioning the rollers in the rollways.

Referring to Fig. 7 the arrows indicate the direction the starter pulley turns to rotate the driven pulley in starting the engine. Rotating starter pulley 31 by means of starter rope 36 causes this pulley to turn clockwise (Fig. 7) turning insert 65 relative to sleeve 32. Ring 68 being in part in frictional engagement with the outer surface of sleeve 32 is held against rotation which causes the rollers to travel up the inclined bottom surface of the rollways and jam against the sleeve 32. A driving relation is established between starter pulley 31 and sleeve 32 causing the sleeve 32 and thus driven pulley 16 to rotate with starter pulley 31.

When the engine starts the speed of driven pulley 16 increases and sleeve 32 is turned at a higher speed than starter pulley 31 and the insert 65. The rollers 67 being in engagement with sleeve 32 are driven into the deep portions 75 of the rollways automatically disengaging the starter pulley from sleeve 32. Upon releasing grip 40 reward spring 38 expands and rotates starter pulley 31 counterclockwise pulling the starter rope 36 back into the housing and winding it in the groove 39 on the periphery of the pulley.

Starter pulley 31 is carried on bushing 62' adjacent driven pulley 16 and has formed on the face opposite driven pulley 16, a circular flange 71 which extends cavity 64. Spring 38 is fastened at one end to a cover 72 which is secured in the engine housing and at its other end hooks onto a pin 73 fastened to the starter pulley 31. Turning starter pulley 31 clockwise extends the spring 38 which acts to oppose such movement and when the starter rope is released returns pulley 31 to its first position.

Inside cavity 64 and covering the over-riding clutch assembly is an oil seal 74 which rides in friction relation with the outside of sleeve 32. This oil seal 74 acts to hold the ring 68 in proper position and also keeps oil fed to this assembly from leaking toward the driven pulley and centrifugal clutch assembly housed within that pulley.

Starter pulley 31 is mounted on bushing 62' which is freely rotatable on sprocket shaft 13 and includes a hub portion 34 the innermost end of which is spaced from the wall 75 in sleeve 32 formed where the sleeve is reduced in diameter. Bushings 62 and 62' abut each other and serve to maintain driven pulley 16 and starter pulley 31 separated.

Crankshaft 21 is journalled in engine housing 12 in bearings 76, 77 and carries on one end fan 37. Between fan 37 and drive pulley 20 may be mounted a magneto (not shown) for supplying electrical energy to the ignition system of the engine. On the other end of the crankshaft 21 an eccentric 78 is provided mounted on a flywheel 79. Connecting rod 22 encircles at its lower end eccentric 78, and is carried at its upper end on a wristpin 79 in position 23.

Engine housing 12 is formed in three principal parts in the saw shown in the drawings, one part being a single main casting 80 supporting bearing plates 82 and 83. In bearing plate 82 which is fastened in a large bore in the main casting 80 provision is made to support bearings 17 and 81 in which sprocket shaft 13 is journalled. Bearing plate 83 is formed as an insert and supported on an interior wall 84 of the main casting and forms the support for bearing 76 which locates crankshaft 21. Various covers are provided for the engine housing such as transmission cover 27 which encloses the sprocket shaft assembly, and shroud 86 which encloses the fan end of the crankshaft.

Having a single main casting, parallel alignment of the sprocket shaft and crankshaft can be assured, a necessity in a high speed machine of this type, and at low cost since the bore 88 receiving the sprocket shaft bearing plate 82 and the bore 89 receiving crankshaft oil seal 90 can be precisely established with respect to each other. From these reference bores, bearing plate 82 may be exactly located with the bearings 17 and 81 to support the sprocket shaft; and bearing 77, bearing plate 83 and bearing 76 may be exactly and precisely located to support crankshaft 21.

Accessibility to the sprocket shaft assembly and the magneto is improved with a transmission constructed as described hereinbefore. Replacement of the belt and servicing the other components is more easily accomplished with the arrangement of the driven pulley and rewind starter rotatably supported on the sprocket shaft and removable from this shaft by the simple operation of sliding the assembly off the shaft and out the side of the housing.

The invention has been described with reference to a specific preferred embodiment but it will be understood that modifications and changes within the purview of a man skilled in the art may be made without departing from the spirit of the invention as defined in the appended claims.

We claim:

1. The combination in a gasoline engine chain saw, of a sprocket shaft, a driven pulley to actuate the sprocket shaft journalled on the sprocket shaft, a sleeve carried behind the pulley, drive means from the engine crankshaft to said pulley, a starter assembly located adjacent the driven pulley having a hub journalled on the sprocket shaft comprising a starter pulley provided with a circular flange forming a recess into which the sleeve on the driven pulley extends, rollways formed in the outer circumferential surface of the recess having shallow and deep portions, rollers in the rollways and arranged between the said outer surface of the recess and the sleeve, a roller cage having an inner ring portion with openings to receive the rollers, said inner ring portion being in contact with the sleeve so that the rollers shift between the shallow and deep portions of the rollways upon relative movement of the hub and the ring portion, said rollers being arranged to establish a unidirectional drive relation between the starter pulley and the driven pulley when the rollers are shifted to the shallow portions and a disengaged relation when the rollers are shifted to the deep portions of the rollways; and a centrifugal clutch assembly comprising centrifugally actuated clutch shoes carried on the face of the pulley and a clutch drum keyed on the sprocket shaft, for engaging the driven pulley and the sprocket shaft.

2. The combination in a gasoline engine chain saw, of a sprocket shaft, a driven pulley journalled on the sprocket shaft, a starter pulley located adjacent the driven pulley having a hub journalled on the sprocket shaft, said starter pulley having an annular recess around the hub, a sleeve carried on the driven pulley extending into said recess and bearing on the inside upon the hub, an over-riding clutch assembly housed in the recess and arranged to engage the outside of the sleeve to establish a unidirectional drive relation between the starter pulley and the driven pulley when the clutch is engaged, and centrifugal clutch means for coupling the driven pulley and the sprocket shaft.

3. A drive control mechanism for a power chain saw comprising a sprocket shaft, a driven pulley journaled upon said sprocket shaft for independent rotation thereon, a starter pulley journaled upon said sprocket shaft for independent rotation with reference to said shaft and said driven pulley, said starter pulley being disposed adjacent said driven pulley and providing an annular recess facing the same, said driven pulley providing an annular sleeve fixed thereto and projecting into the annular recess of said starter pulley, and an over-riding clutch assembly housed within said recess for establishing a unidirectional drive relation between said starter pulley and the sleeve of said driven pulley.

4. The structure of claim 3 in which said driven pulley is provided with an annular chamber therein, and centrifugal clutch means being mounted within said chamber and being operatively engageable with said shaft for coupling said driven pulley and shaft against independent relative rotation when said driven pulley reaches a predetermined rotational speed.

5. The structure of claim 3 in which said over-riding clutch assembly comprises an annular roller cage mounted within said recess between the upper surface thereof and the periphery of said sleeve, rollers carried by said cage, said starter pulley being provided with deep and shallow portions along the outer surface of said recess, said rollers being arranged to establish a unidirectional drive relation between said starter pulley and said sleeve when said rollers are shifted to the shallow portions and a disengaged relation when the rollers are shifted to the deep portions of said outer surface.

6. A drive control mechanism for a power chain saw comprising a single unitary sprocket shaft, a driven pulley and a starter pulley rotatably mounted adjacent each other upon said shaft and each being independently rotatable with reference to each other and to said shaft, said starter pulley having an annular recess facing said driven pulley, said driven pulley providing a sleeve rotatably nested within the recess of said starter pulley, a clutch assembly disposed within said recess for establishing a unidirectional drive relation between said starter pulley and said sleeve, and centrifugal clutch means provided by said driven pulley to couple the same with said shaft for simultaneous rotation therewith when said driven pulley reaches a preselected rotational speed.

References Cited in the file of this patent

UNITED STATES PATENTS

| | | |
|---|---|---|
| 2,177,199 | Lansing | Oct. 24, 1939 |
| 2,429,153 | Ammon et al. | Oct. 14, 1947 |
| 2,471,747 | Hinden et al. | May 31, 1949 |
| 2,480,550 | Catlin | Aug. 30, 1949 |
| 2,538,147 | DuShane | Jan. 16, 1951 |
| 2,642,055 | Dalrymple | June 16, 1953 |
| 2,697,423 | Hare | Dec. 21, 1954 |
| 2,799,265 | Bakke et al. | July 16, 1957 |